(12) United States Patent
Hwang

(10) Patent No.: US 8,619,119 B2
(45) Date of Patent: Dec. 31, 2013

(54) DIGITAL PHOTOGRAPHING APPARATUS

(75) Inventor: Soon-hoon Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 442 days.

(21) Appl. No.: 12/858,628

(22) Filed: Aug. 18, 2010

(65) Prior Publication Data

US 2011/0043605 A1     Feb. 24, 2011

(30) Foreign Application Priority Data

Aug. 24, 2009   (KR) .................. 10-2009-0078177

(51) Int. Cl.
*H04N 5/232*     (2006.01)
(52) U.S. Cl.
USPC ........................................................ 348/36
(58) Field of Classification Search
USPC ........................................................ 348/36
See application file for complete search history.

(56) References Cited

U.S. PATENT DOCUMENTS

| | | | | |
|---|---|---|---|---|
| 4,273,430 A * | 6/1981 | Fritsche et al. | ............... | 396/153 |
| 4,518,992 A * | 5/1985 | Kessler et al. | ............... | 348/163 |
| 4,860,096 A * | 8/1989 | Long et al. | ............... | 348/61 |
| 4,974,950 A * | 12/1990 | Yamazaki et al. | ........... | 359/557 |
| 5,218,442 A * | 6/1993 | Hamada et al. | .......... | 348/208.15 |
| 5,339,104 A * | 8/1994 | Hong | ............................. | 348/155 |
| 5,361,104 A * | 11/1994 | Ohki | ............................ | 348/699 |
| 5,502,484 A * | 3/1996 | Okada | ......................... | 348/208.6 |
| 5,623,305 A * | 4/1997 | Ishizuka et al. | ........... | 348/208.8 |
| 5,812,886 A * | 9/1998 | Imura | ............................ | 396/55 |
| 5,937,214 A * | 8/1999 | Shintani et al. | ................ | 396/55 |
| 5,946,032 A * | 8/1999 | Ishizuka et al. | ........... | 348/208.8 |
| 6,067,420 A * | 5/2000 | Hara et al. | ...................... | 396/55 |
| 6,310,920 B1 * | 10/2001 | Ogawa | ..................... | 375/240.17 |
| 6,507,366 B1 * | 1/2003 | Lee | ................................ | 348/352 |
| 6,542,076 B1 * | 4/2003 | Joao | ......................... | 340/539.14 |
| 6,630,950 B1 * | 10/2003 | Ohkawara et al. | ....... | 348/208.12 |
| 7,565,068 B2 * | 7/2009 | Endo | ................................ | 396/52 |
| 2001/0028798 A1 * | 10/2001 | Manowitz et al. | ............ | 396/429 |
| 2003/0156203 A1 * | 8/2003 | Kondo et al. | ............. | 348/222.1 |
| 2004/0052513 A1 * | 3/2004 | Ohkawara et al. | .............. | 396/55 |
| 2004/0114037 A1 * | 6/2004 | Kawazoe et al. | ............. | 348/143 |
| 2005/0096569 A1 * | 5/2005 | Sato et al. | ..................... | 600/595 |
| 2005/0147277 A1 * | 7/2005 | Higaki et al. | ................. | 382/103 |
| 2006/0127071 A1 * | 6/2006 | Takeuchi et al. | ................ | 396/55 |
| 2006/0187333 A1 * | 8/2006 | Kobayashi et al. | ...... | 348/333.01 |
| 2007/0113110 A1 * | 5/2007 | Mizutani | ...................... | 713/300 |
| 2007/0229669 A1 * | 10/2007 | Yamamoto | ............... | 348/207.99 |
| 2007/0242937 A1 * | 10/2007 | Sano et al. | ....................... | 396/55 |
| 2007/0248260 A1 * | 10/2007 | Pockett | ......................... | 382/154 |
| 2009/0091633 A1 * | 4/2009 | Tamaru | .................... | 348/208.14 |
| 2009/0102935 A1 * | 4/2009 | Hung et al. | ................. | 348/222.1 |
| 2009/0128640 A1 * | 5/2009 | Yumiki | ....................... | 348/208.6 |
| 2009/0153690 A1 * | 6/2009 | Li et al. | ..................... | 348/222.1 |
| 2009/0167883 A1 * | 7/2009 | Nozaki | ....................... | 348/222.1 |
| 2009/0256921 A1 * | 10/2009 | Pertsel et al. | ............ | 348/208.16 |
| 2010/0053343 A1 * | 3/2010 | Kim et al. | .................. | 348/208.4 |
| 2010/0053418 A1 * | 3/2010 | Irie | ............................... | 348/345 |
| 2010/0141783 A1 * | 6/2010 | Sakaguchi et al. | ......... | 348/222.1 |

* cited by examiner

*Primary Examiner* — Sath V Perungavoor
*Assistant Examiner* — Peter D Le
(74) *Attorney, Agent, or Firm* — Drinker Biddle & Reath LLP

(57) ABSTRACT

Provided is a digital photographing apparatus and method for panoramic photographing. The digital photographing apparatus includes an image pickup device that generates data from incident light, an acceleration sensor that detects motion of the digital photographing apparatus in a first direction, and a time interval determiner that determines a continuous photographing time interval for panoramic photographing, according to the motion detected by the acceleration sensor.

20 Claims, 6 Drawing Sheets

DIGITAL PHOTOGRAPHING APPARATUS

CROSS-REFERENCE TO RELATED PATENT APPLICATION

This application claims the benefit of Korean Patent Application No. 10-2009-0078177, filed on Aug. 24, 2009, in the Korean Intellectual Property Office, the disclosure of which is incorporated herein in its entirety by reference.

BACKGROUND

The present invention relates to a digital photographing apparatus, and more particularly, to a digital photographing apparatus capable of panoramic photographing.

Generally, a digital photographing apparatus generates data from incident light, and in some cases, may display an image from the data on a display unit. Moreover recently, digital photographing apparatuses have been developed to overcome photographable angle limitations by having a panoramic photographing function.

To perform panoramic photographing using a conventional digital photographing apparatus, photographing may be performed a plurality of times while a user moves the conventional digital photographing apparatus. After performing the photographing a plurality of times, one panoramic image may be obtained by synthesizing a first though nth number of sequential images obtained through the photographing.

However, when panoramic photographing is performed using the conventional digital photographing apparatus, it is difficult to perform the panoramic photographing successfully. Moreover, it is difficult to determine whether the panoramic photographing has succeeded.

SUMMARY

The present invention provides a digital photographing apparatus for effective panoramic photographing.

According to an aspect of the present invention, there is provided a digital photographing apparatus capable of panoramic photographing, the digital photographing apparatus including: an image pickup device that generates data from incident light; an acceleration sensor that detects motion of the digital photographing apparatus in a first direction; and a time interval determiner that determines a continuous photographing time interval for panoramic photographing, according to the motion detected by the acceleration sensor.

The time interval determiner may determine the continuous photographing time interval to be shorter as the motion is greater.

The time interval determiner may determine the continuous photographing time interval continuously during the panoramic photographing.

The first direction may be a horizontal direction with respect to the ground.

The acceleration sensor may detect motion in a second direction perpendicular to the first direction.

The digital photographing apparatus may further include a success determiner that determines whether the panoramic photographing has been performed successfully by comparing the amount of the motion in the second direction detected by the acceleration sensor with a predetermined amount.

The success determiner may determine that the panoramic photographing has failed, if the amount of the motion in the second direction is greater than the predetermined amount.

When the success determiner determines that the panoramic photographing has failed, the digital photographing apparatus may notify a user about the failure.

According to another aspect of the present invention, there is provided a digital photographing apparatus capable of panoramic photographing, the digital photographing apparatus including: an image pickup device that generates data from incident light; an acceleration sensor that detects motion in a first direction of the digital photographing apparatus; and a success determiner that determines whether the panoramic photographing has succeeded by comparing the amount of the motion in the first direction detected by the acceleration sensor with a predetermined amount.

The success determiner may determine that the panoramic photographing has failed if the amount of the motion in the first direction is larger than the predetermined amount.

When the success determiner determines failure, the digital photographing apparatus may notify a user about the failure.

The first direction may be perpendicular to a horizontal direction with respect to the ground.

According to an aspect of the present invention, there is also provided a method of generating panoramic photos, the method comprising: providing a digital photographing apparatus including an image pick device, an acceleration sensor and a time interval determiner; generating data from incident light; detecting, by the acceleration sensor, motion of the digital photographing apparatus in a first direction; and determining, by the time interval determiner, continuous photographing time interval for panoramic photographing, according to the motion detected by the acceleration sensor.

The method may further comprise detecting motion in a second direction perpendicular to the first direction. The method may comprise the step of determining whether the panoramic photographing has been performed successfully by comparing the amount of the motion in the second direction detected by the acceleration sensor with a predetermined amount. In another embodiment, the method may additionally comprise determining that the panoramic photographing has failed if the amount of the motion in the second direction is greater than the predetermined amount. The method may comprise the step of notifying a user when the determining step determines that the panoramic photographing has failed.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, the present invention will be described more fully with reference to the accompanying drawings, in which exemplary embodiments of the invention are shown.

Figure 1:
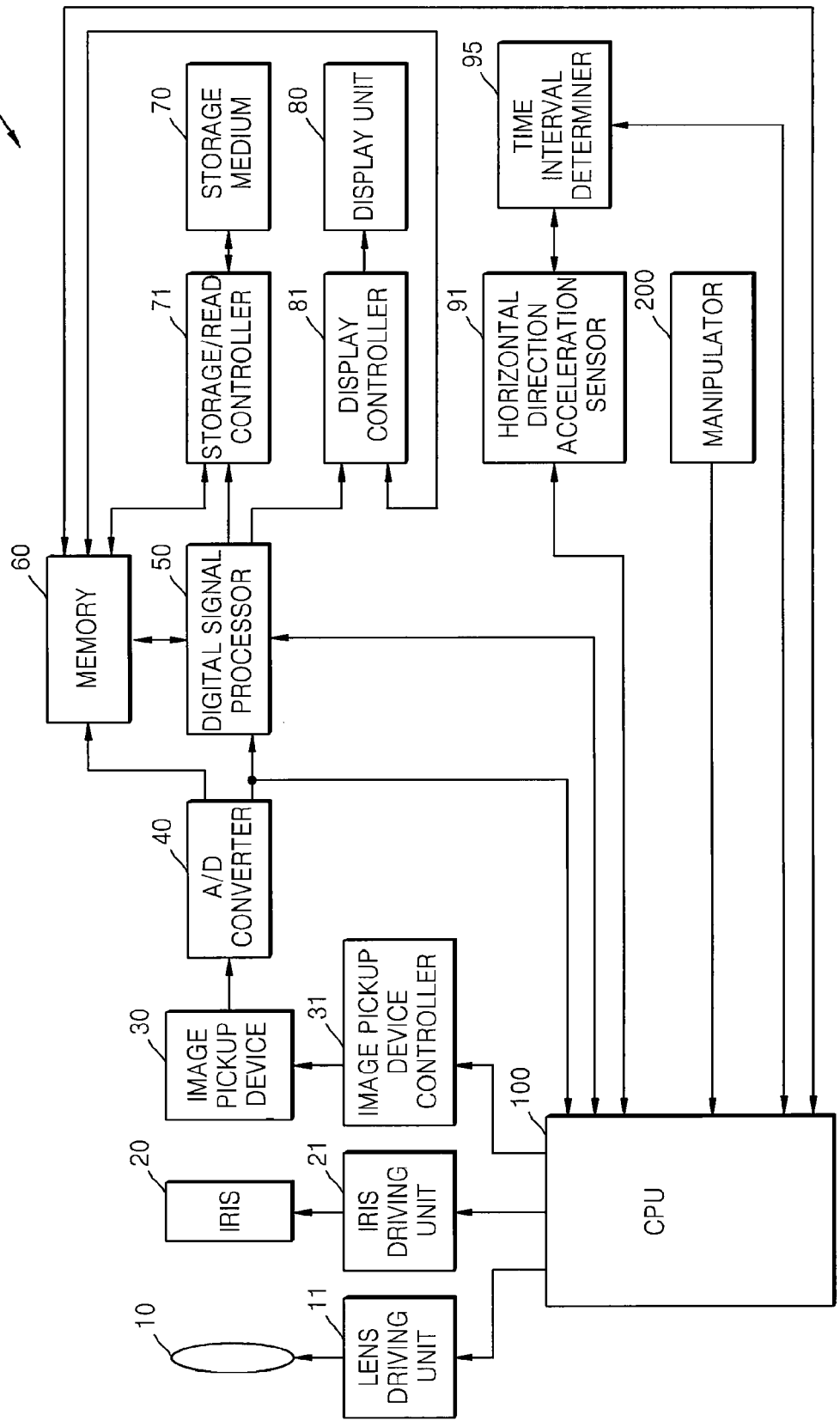
FIG. 1 is a block diagram schematically illustrating a digital photographing apparatus according to an embodiment of the present invention.

FIG. 1 is a block diagram schematically illustrating a digital photographing apparatus 1 according to an embodiment of the present invention.

Overall operations of the digital photographing apparatus 1 are administered by a central processing unit (CPU) 100. Also, the digital photographing apparatus 1 includes a manipulator 200 including a button that generates an electric signal according to a user's manipulation. The electric signal is transferred to the CPU 100, and the CPU 100 controls the digital photographing apparatus 1 according to the electric signal.

In a photographing mode, when the user applies the electric signal to the CPU 100, the CPU 100 detects the electric signal and controls a lens driving unit 11, an iris driving unit 21, and an image pickup device controller 31. Accordingly, a location of a lens 10, an aperture of an iris 20, and sensitivity of an image pickup device 30 are controlled. The image pickup device 30 generates data from incident light, and an analog to digital (A/D) converter 40 converts analog data output from the image pickup device 30 to digital data. Here, the A/D converter 40 may not be included according to characteristics of the image pickup device 30.

The data from the image pickup device 30 may be input to a digital signal processor 50 directly or through a memory 60, and if required, may be input to the CPU 100. Here, the memory 60 may be a read only memory (ROM) or a random access memory (RAM). The digital signal processor 50 may perform digital signal process, such as gamma compensation or white balance adjustment, if required.

Data output from the digital signal processor 50 may be transmitted to a display controller 81 directly or through the memory 60. The display controller 81 controls a display unit 80 so as to display an image on the display unit 80. Also, the data output from the digital signal processor 50 may be input to a storage/read controller 71 directly or through the memory 60. The storage/read controller 71 stores the data in a storage medium 70 automatically or according to a signal from the user. Here, the storage/read controller 71 may read data from a file stored in the storage medium 70, and transmit the read data to the display controller 81 through the memory 60 or another path, so that an image may be displayed on the display unit 80. The storage medium 70 may be detachable, or permanently installed in the digital photographing apparatus 1.

A horizontal direction acceleration sensor 91 detects motion of the digital photographing apparatus 1 in a horizontal direction with respect to the ground, and a time interval determiner 95 determines a continuous photographing time interval for panoramic photographing, according to the motion detected by the horizontal direction acceleration sensor 91. The horizontal direction acceleration sensor 91 measures gravity of the earth, and the digital photographing apparatus 1 may calculate an amount of motion or speed of the digital photographing apparatus 1 in a horizontal direction based on a measured value. For example, a voltage value related to motion of the digital photographing apparatus 1 in a horizontal direction is measured, thereby calculating a horizontal direction motion speed of the digital photographing apparatus 1. Operations of an acceleration sensor are disclosed in Korean Patent No. 2008-0007027, which is incorporated herein in its entirety by reference.

Not all the elements described above are always essential in the digital photographing apparatus 1. In other words, the digital photographing apparatus 1 according to the current embodiment of the present invention may only include the image pickup device 30, the horizontal direction acceleration sensor 91, and the time interval determiner 95.

Figure 2A:
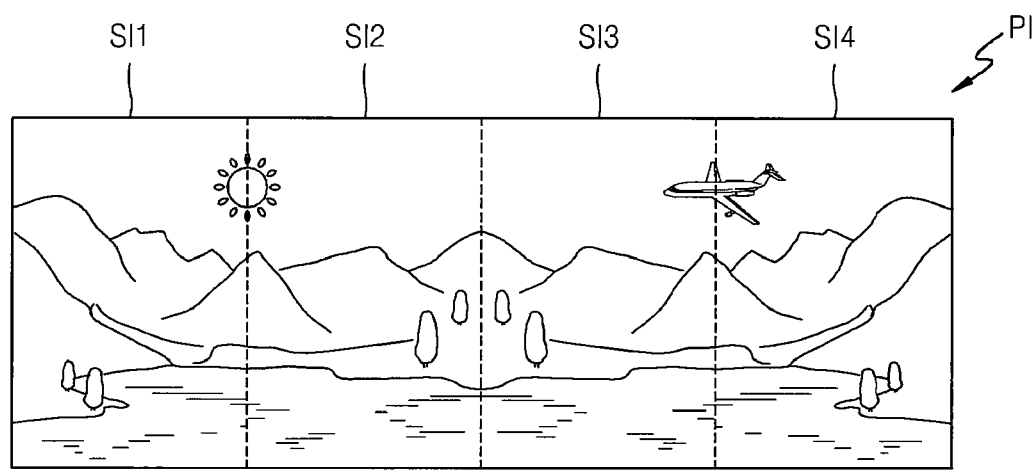
FIG. 2A is a conceptual diagram schematically illustrating a panoramic image obtained by the digital photographing apparatus of FIG. 1.
Figure 2B:
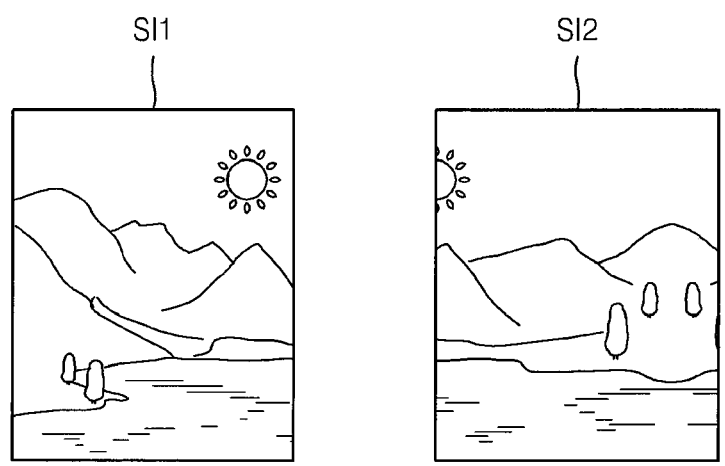
FIG. 2B is a conceptual diagram schematically illustrating a first image and a second image used to synthesize the panoramic image of FIG. 2A.
Figure 3:
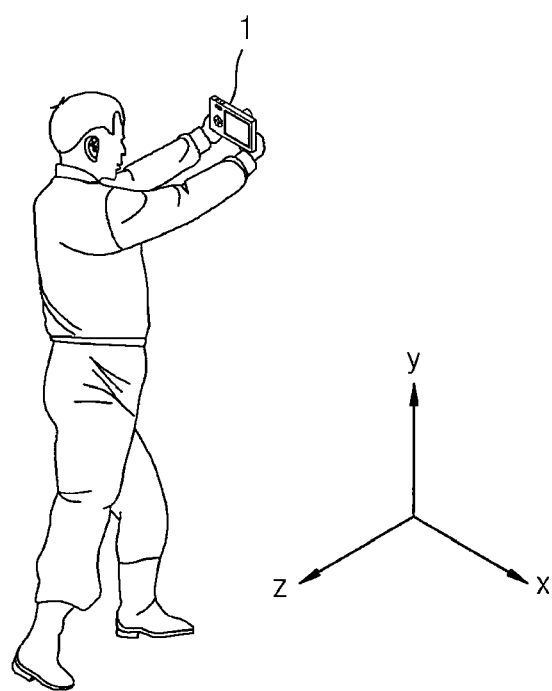
FIG. 3 is a conceptual diagram schematically illustrating a user performing panoramic photographing using the digital photographing apparatus of FIG. 1.

FIG. 2A is a conceptual diagram schematically illustrating a panoramic image PI obtained by the digital photographing apparatus 1 of FIG. 1, FIG. 2B is a conceptual diagram schematically illustrating a first image SI1 and a second image SI2 used to synthesize the panoramic image of FIG. 2A, and FIG. 3 is a conceptual diagram schematically illustrating a user performing panoramic photographing using the digital photographing apparatus 1 of FIG. 1. Accordingly, the panoramic image PI may be obtained using the digital photographing apparatus 1.

Panoramic photographing includes obtaining data corresponding to a plurality of images through continuous photographing as a user horizontally (in FIG. 3, in a ±x direction) moves the digital photographing apparatus 1, and then obtaining data corresponding to a panoramic image obtained by synthesizing the plurality of images. Here, the digital photographing apparatus 1 may only obtain the data corresponding to the plurality of images. The user may obtain the panoramic image using a separate apparatus, such as a computer. In case of a highly efficient digital photographing apparatus 1, the highly efficient digital photographing apparatus 1 may synthesize the plurality of image to obtain the panoramic image, and then may store the panoramic image in a storage medium.

As shown in FIG. 3, when the user performs panoramic photographing using the digital photographing apparatus 1, the image pickup device 30 obtains data from incident light, wherein the data corresponds to a plurality of images SI1 through SI4. Here, according to the digital photographing apparatus 1 of the current embodiment of the present invention, the horizontal direction acceleration sensor 91 detects motion of the digital photographing apparatus 1 in a horizontal direction with respect to the ground, and the time interval determiner 95 determines a continuous photographing time interval for panoramic photographing, according to the motion detected by the horizontal direction acceleration sensor 91. The time interval determiner 95 determines the continuous photographing time interval to be shorter as the motion is greater.

As described above, the panoramic image PI is obtained by synthesizing the plurality of images SI1 through SI4. For example, the result of synthesizing the first and second images SI1 and SI2 shown in FIG. 2B is a part of the panoramic image PI shown in FIG. 2A. Here, as shown in FIG. 2B, the first and second images SI1 and SI2 are obtained in such a way that some portions of the first and second images SI1 and SI2 overlap each other. This is because if the first and second images SI1 and SI2 do not overlap, there may be a space in the panoramic image PI.

In a conventional digital photographing apparatus, images are photographed continuously according to a uniform continuous photographing time interval without considering motion of the conventional digital photographing apparatus during panoramic photographing. Accordingly, when the motion of the conventional digital photographing apparatus is relatively great compared to the uniform continuous photographing time interval, obtained images do not overlap, and thus an accurate panoramic image may not be obtained. Alternatively, when the motion is relatively little compared to the uniform continuous photographing time interval, the obtained images overlap too much, and thus a panoramic image may not have a desired length.

However, in the digital photographing apparatus 1 according to the current embodiment of the present invention, the horizontal direction acceleration sensor 91 detects motion of the digital photographing apparatus 1 in the horizontal direction, and the time interval determiner 95 determines the continuous photographing time interval for panoramic photographing, according to the motion detected by the horizontal direction acceleration sensor 91. In detail, the time interval determiner 95 determines the continuous photographing time interval to be short when the motion is great. Accordingly, overlapping portions are generated in the first through fourth images SI1 through SI4 obtained for the panoramic image PI, and thus effective panoramic photographing may be achieved since the continuous photographing time interval is determined such that the panoramic image PI is accurately obtained while the overlapping portions are not too large. For example, when each of the first through fourth images SI1 through SI4 has a size of 720×480 pixels, the second image SI2 may be obtained when the digital photographing apparatus 1 moves in the horizontal direction a distance corresponding to a range from 700 pixels after obtaining the first image SI1, so that a length of about 20 pixels overlap in the first and second images SI1 and SI2.

In FIG. 2A, the panoramic image PI is obtained by synthesizing the 4 images, i.e., the first through fourth images SI1 through SI4, but the number of images used to obtain the panoramic image PI is not limited thereto.

Meanwhile, when the user performs panoramic photographing while moving the digital photographing apparatus 1 in the horizontal direction (±x direction) as shown in FIG. 3, the degree of motion of the digital photographing apparatus 1 may not always be uniform. For example, the speed of moving the digital photographing apparatus 1 may increase. If the continuous photographing time interval is also uniform in this case, images that are taken later may not overlap each other, and thus the panoramic image PI may not be accurately obtained. Alternatively, the speed of moving the digital photographing apparatus 1 may decrease. If the continuous photographing time interval is also uniform in this case, images that are taken later may overlap too much, and thus the length of the panoramic image PI may be shorter than expected.

Accordingly, the time interval determiner 95 may continuously determine the continuous photographing time interval during panoramic photographing, thereby obtaining the (optimum) panoramic image PI.

Figure 4:
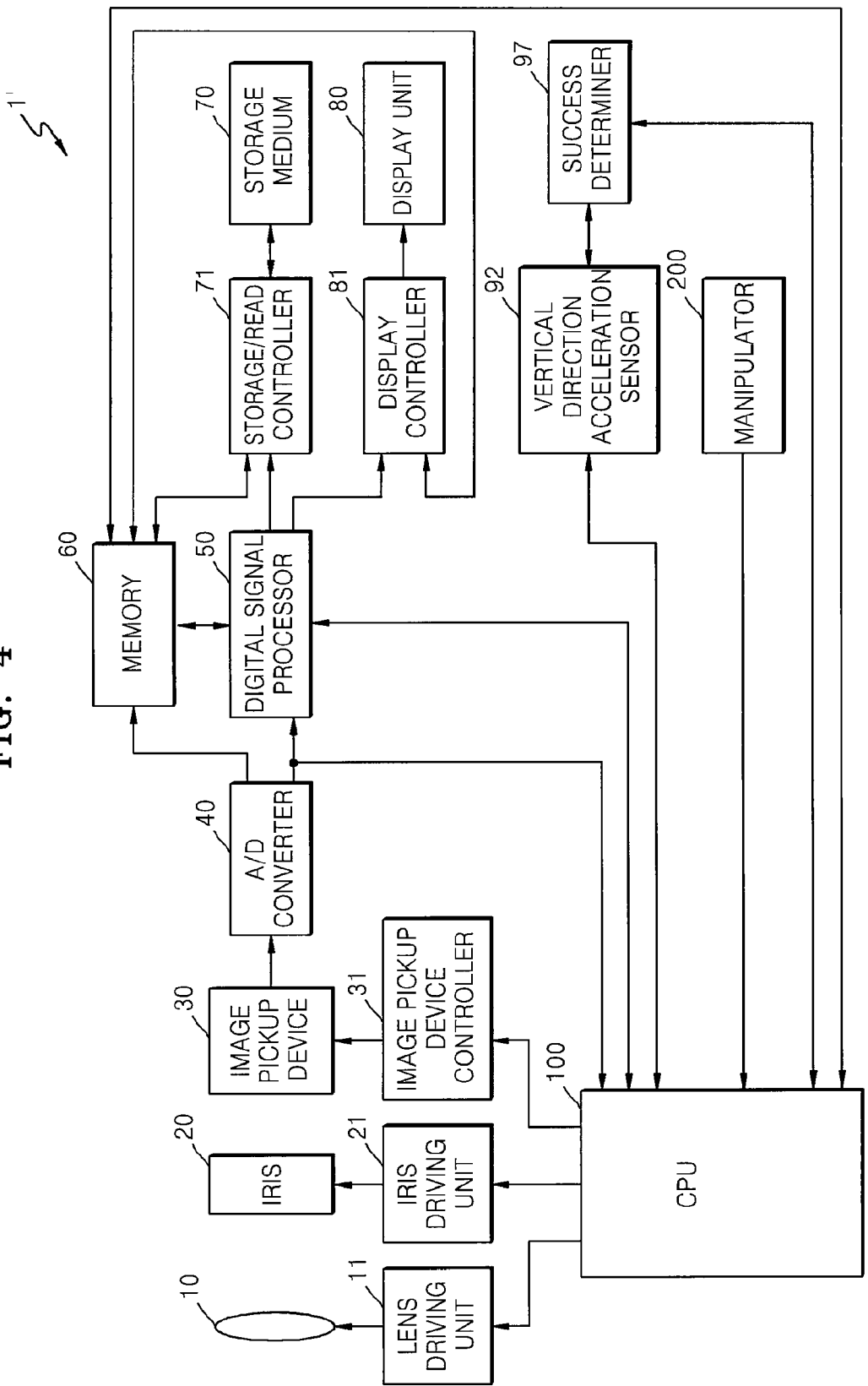
FIG. 4 is a block diagram schematically illustrating a digital photographing apparatus according to another embodiment of the present invention.

FIG. 4 is a block diagram schematically illustrating a digital photographing apparatus 1' according to another embodiment of the present invention. The difference between the digital photographing apparatus 1' of the current embodiment with that of the previous embodiment is that the digital photographing apparatus 1' of the current embodiment includes a vertical direction acceleration sensor 92 and a success determiner 97, instead of the horizontal direction acceleration sensor 91 and the time interval determiner 95.

Figure 5:
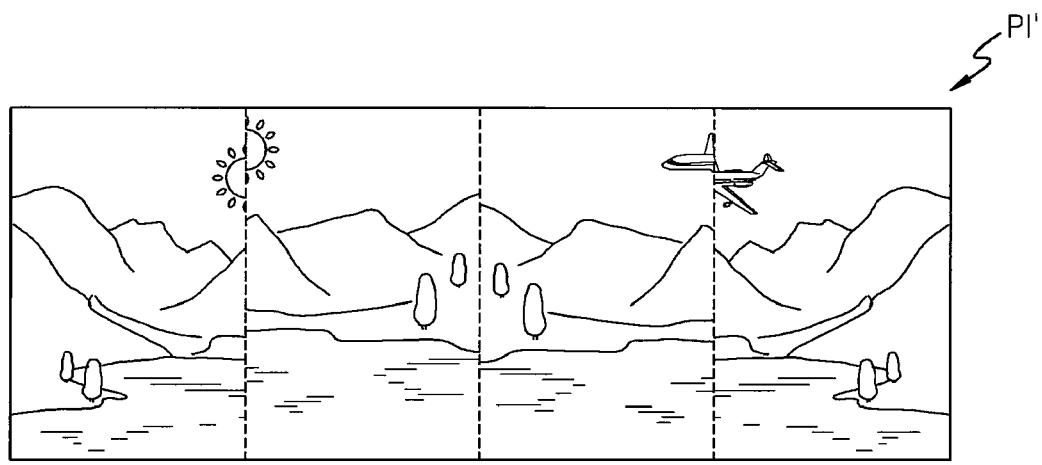
FIG. 5 is a conceptual diagram schematically illustrating a panoramic image obtained using a conventional digital photographing apparatus.

The vertical direction acceleration sensor 92 detects motion (size of motion, speed of motion, or the like) of the digital photographing apparatus 1' in a ±y direction shown in FIG. 3. When a panoramic image is obtained using a conventional digital photographing apparatus, the locations of the subjects may not fit with each other on the boundaries of a plurality of images as shown in a conceptual diagram of FIG. 5, schematically illustrating the panoramic image obtained using the conventional digital photographing apparatus. This is because the conventional digital photographing apparatus may be moved up and down while obtaining the plurality of images for panoramic photographing. In addition, it is difficult to determine whether the panoramic image is satisfactorily obtained.

For example, when a conventional digital photographing apparatus obtains a plurality of images in a panoramic photographing mode, and a user may obtain, by using a separate apparatus, such as a computer, a panoramic image by synthesizing together the plurality of images. However, the user may be unable to determine whether the plurality of images are accurately obtained. Also, even when the conventional digital photographing apparatus displays a panoramic image on a display unit after synthesizing together a plurality of images, it is difficult to determine whether the panoramic image is accurately obtained by looking at the panoramic image through the small display unit.

However, according to the digital photographing apparatus 1' of the current embodiment, the success determiner 97 determines whether panoramic photographing has been performed successfully by comparing the amount of the motion of the digital photographing apparatus 1' in the vertical direction with a predetermined amount. The success determiner 97 determines that panoramic photographing has failed when the amount of the motion is larger than the predetermined amount. Failure may be notified to the user by displaying a message on the display unit, or by an alarm. Accordingly, the user effectively may determine whether panoramic photographing has been performed successfully, immediately.

The success determiner 97 may determine whether panoramic photographing has been performed successfully by using any of various methods. For example, when each of a plurality of images obtained for panoramic photographing has a size of 720×480 pixels, the success determiner 97 may determine that panoramic photographing has failed if the digital photographing apparatus 1' is moved in the vertical direction by a distance corresponding to more than about 14 pixels, i.e., 3% of the 480 pixels.

Figure 6:
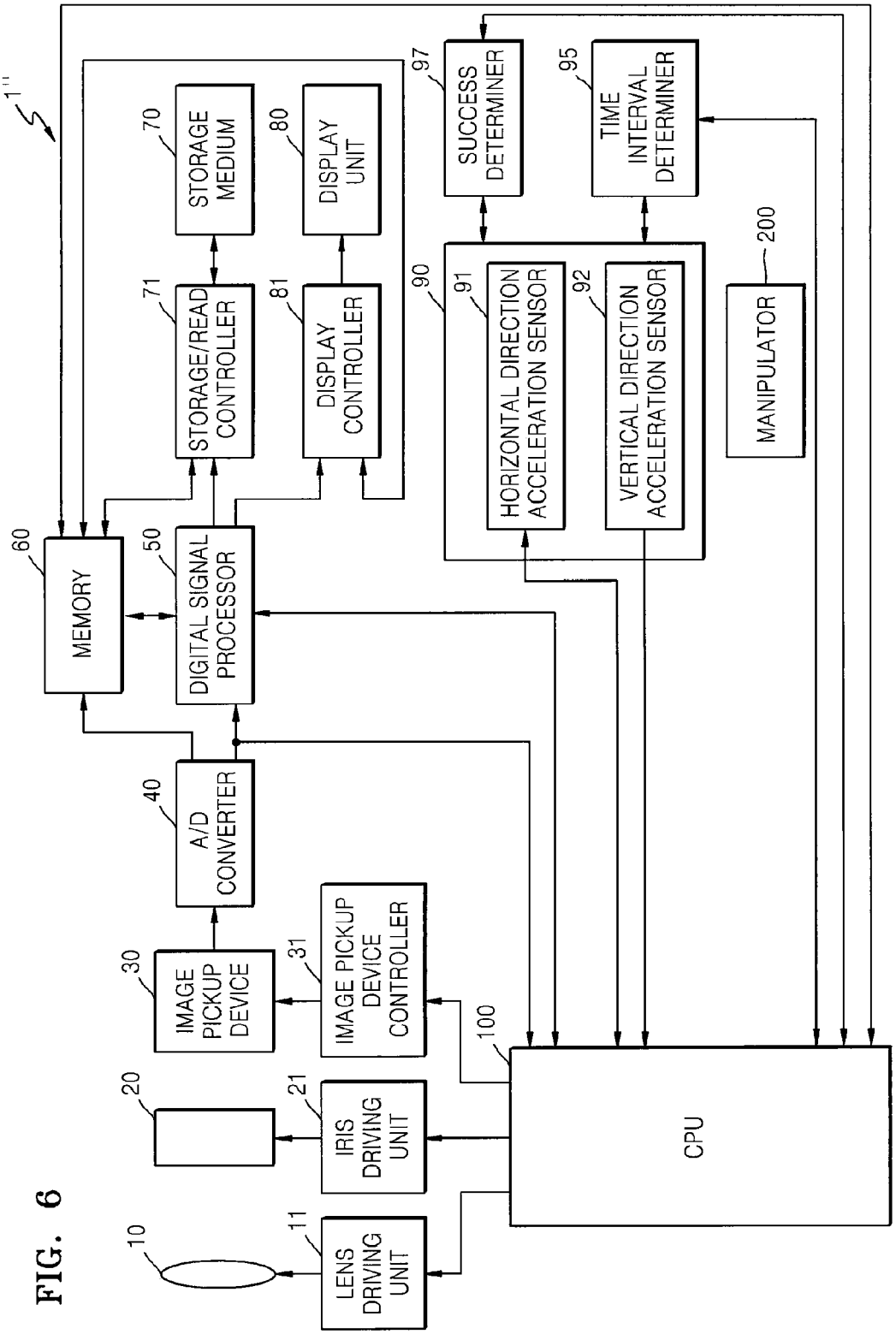
FIG. 6 is a block diagram schematically illustrating a digital photographing apparatus according to another embodiment of the present invention.

FIG. 6 is a block diagram schematically illustrating a digital photographing apparatus 1" according to another embodiment of the present invention. The digital photographing apparatus 1" according to the current embodiment of the present invention includes an acceleration sensor 90 including the horizontal direction acceleration sensor 91 and the vertical direction acceleration sensor 92. Also, the digital photographing apparatus 1" includes the time interval determiner 95 and the success determiner 97.

According to the digital photographing apparatus 1" of the current embodiment, effective panoramic photographing may be achieved by determining a continuous photographing time interval for panoramic photographing as described with reference to FIG. 1 by using the horizontal direction acceleration sensor 91 and the time interval determiner 95. The time interval determiner 95 may determine the continuous photographing time interval to be relatively short when the motion of the digital photographing apparatus 1" detected by the horizontal direction acceleration sensor 91 is relatively great, and moreover, the time interval determiner 95 may continuously determine the continuous photographing time interval during panoramic photographing.

In addition, the digital photographing apparatus 1" may determine whether panoramic photographing has been performed successfully as described with reference to FIG. 4 by using the vertical direction acceleration sensor 92 and the success determiner 97. The success determiner 97 may determine that panoramic photographing has failed if the amount of the motion of the digital photographing apparatus 1" in the vertical direction detected by the vertical direction acceleration sensor 92 is greater than a predetermined amount. If failure has been determined, the digital photographing apparatus 1" may notify the user about the failure by displaying a message on a display unit or by an alarm.

When the user performs panoramic photographing by using the digital photographing apparatus 1" as shown in FIG. 3, the ±x direction is a horizontal direction and the ±y direction is a vertical direction. Accordingly, the motion of the digital photographing apparatus 1" in a horizontal direction is detected by the horizontal direction acceleration sensor 91 of the acceleration sensor 90, and the motion of the digital photographing apparatus 1" in a vertical direction is detected by the vertical direction acceleration sensor 92 of the acceleration sensor 90. Here, the motion of the digital photographing apparatus 1" in a ±z direction may not need to be detected, since generally a user is able to position the digital photographing apparatus 1" in a uniform distance corresponding to the arm from the body, and thus the motion in the ±z direction may be ignored. Also, in case of panoramic photographing, most often, a scene in the far distance is photographed, and thus the change in a distance between the user and the digital photographing apparatus 1", i.e., the ±z direction, does not substantially affect the panoramic image. However, the motion of the digital photographing apparatus 1" in a horizontal or vertical direction directly affects the quality of the panoramic image, and thus the digital photographing apparatus 1" according to the current embodiment of the present invention includes the horizontal direction acceleration sensor 91 and the vertical direction acceleration sensor 92 so as decrease the number of components of the digital photographing apparatus 1" while being able to realize an accurate panoramic photographing function.

According to the digital photographing apparatus of the present invention, a digital photographing apparatus capable of effective panoramic photographing may be achieved.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

Numerous modifications and adaptations will be readily apparent to those skilled in this art without departing from the spirit and scope of the present invention.

What is claimed is:

1. A digital photographing apparatus for panoramic photographing, comprising:
   an image pickup device that generates data from incident light, by capturing a plurality of images while the apparatus is moved in a first direction;
   an acceleration sensor that detects motion of the digital photographing apparatus in the first direction while the image pickup device captures the images; and
   a time interval determiner that determines a time interval associated with each captured image that denotes a time delay between the capture of two successive images, wherein the time interval associated with each image is based on the instantaneous motion detected by the acceleration sensor and a size of the captured image, such that each image has a predetermined overlap with an image captured before and/or after it.

2. The digital photographing apparatus of claim 1, wherein the time interval determiner is further configured to determine the time interval associated with each captured image to be inversely proportional to a speed of the detected motion.

3. The digital photographing apparatus of claim 2, wherein the time interval determiner determines the time interval associated with each captured image continuously during the panoramic photographing.

4. The digital photographing apparatus of claim 1, wherein the first direction is a horizontal direction with respect to the ground.

5. The digital photographing apparatus of claim 4, wherein the acceleration sensor detects motion in a second direction perpendicular to the first direction.

6. The digital photographing apparatus of claim 5, further comprising a success determiner that determines whether the panoramic photographing has been performed successfully by comparing the amount of the motion in the second direction detected by the acceleration sensor with a predetermined amount.

7. The digital photographing apparatus of claim 6, wherein the success determiner determines that the panoramic photographing has failed, if the amount of the motion in the second direction is greater than the predetermined amount.

8. The digital photographing apparatus of claim 7, wherein, when the success determiner determines that the panoramic photographing has failed, the digital photographing apparatus notifies a user about the failure.

9. A digital photographing apparatus for panoramic photographing, comprising:
   an image pickup device that generates data from incident light, by capturing a plurality of images while the apparatus is moved in a first direction;
   an acceleration sensor that detects motion in the first direction of the digital photographing apparatus, while the image pickup device captures the images;
   a time interval determiner that determines a time interval associated with each captured image that denotes a time delay between the capture of two successive images wherein the time interval associated with each image is based on the instantaneous motion detected by the acceleration sensor and a size of the captured image, such that each image has a predetermined overlap with an image captured before and/or after it; and
   a success determiner that determines whether the panoramic photographing has succeeded by comparing the amount of the motion in the first direction detected by the acceleration sensor with a predetermined amount.

10. The digital photographing apparatus of claim 9, wherein the success determiner determines that the panoramic photographing has failed if the amount of the motion in the first direction is larger than the predetermined amount.

11. The digital photographing apparatus of claim 10, wherein, when the success determiner determines failure, the digital photographing apparatus notifies a user about the failure.

12. The digital photographing apparatus of claim 9, wherein the first direction is perpendicular to a horizontal direction with respect to the ground.

13. A method of generating panoramic photos, comprising:
   providing a digital photographing apparatus including an image pickup device, an acceleration sensor and a time interval determiner;
   detecting, by the acceleration sensor, motion of the digital photographing apparatus in a first direction, while the image pickup device captures the images;
   determining, by the time interval determiner, a time interval associated with each image to be captured that denotes a time delay between the capture of two successive images, wherein the time interval associated with each image is based on the instantaneous motion detected by the acceleration sensor and a size of the captured image; and
   generating data from incident light, by capturing a plurality of images with the apparatus while moving the apparatus in a first direction, wherein each successive image is captured after the corresponding determined time delay such that each image has a predetermined overlap with an image captured before and/or after it.

14. The method of generating panoramic photos according to claim 13, further comprising:
   determining the time interval associated with each image to be inversely proportional to a speed of the detected motion.

15. The method of generating panoramic photos according to claim 13, wherein the time interval associated with each image is determined continuously during the panoramic photographing.

16. The method of generating panoramic photos according to claim 13, wherein the first direction is a horizontal direction with respect to the ground.

17. The method of generating panoramic photos according to claim 13, further comprising detecting motion in a second direction perpendicular to the first direction.

18. The method of generating panoramic photos according to claim 13, further comprising determining whether the panoramic photographing has been performed successfully by comparing the amount of the motion in the second direction detected by the acceleration sensor with a predetermined amount.

19. The method of generating panoramic photos according to claim 13, further comprising determining that the panoramic photographing has failed if the amount of the motion in the second direction is greater than the predetermined amount.

20. The method of generating panoramic photos according to claim 13, further comprising notifying a user when the determining step determines that the panoramic photographing has failed.

* * * * *